US008619921B2

(12) United States Patent
Shiokawa

(10) Patent No.: US 8,619,921 B2
(45) Date of Patent: Dec. 31, 2013

(54) CHANNEL ESTIMATION APPARATUS, CHANNEL ESTIMATION METHOD AND PROGRAM

(75) Inventor: Masato Shiokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 60 days.

(21) Appl. No.: 13/379,851

(22) PCT Filed: Jun. 21, 2010

(86) PCT No.: PCT/JP2010/060448
§ 371 (c)(1), (2), (4) Date: Dec. 21, 2011

(87) PCT Pub. No.: WO2010/150733
PCT Pub. Date: Dec. 29, 2010

(65) Prior Publication Data
US 2012/0093271 A1  Apr. 19, 2012

(30) Foreign Application Priority Data
Jun. 23, 2009 (JP) .................................. 2009-148860

(51) Int. Cl.
*H04L 27/06* (2006.01)
(52) U.S. Cl.
USPC ........... 375/340; 375/260; 375/262; 375/265; 375/267; 375/343; 375/346; 375/347; 375/350
(58) Field of Classification Search
USPC ......... 375/260, 262, 267, 340, 343, 346, 347, 375/350; 370/203, 204, 205, 208, 209, 210
See application file for complete search history.

(56) References Cited

U.S. PATENT DOCUMENTS

| 7,639,660 B2 * | 12/2009 | Kim et al. ................... 370/343 |
| 2010/0220808 A1 * | 9/2010 | Kishigami et al. ............ 375/295 |

FOREIGN PATENT DOCUMENTS

| JP | 2005045628 A | 2/2005 |
| JP | 2008004976 A | 1/2008 |
| JP | 2008271298 A | 11/2008 |
| JP | 2008278363 A | 11/2008 |

OTHER PUBLICATIONS

International Search Report for PCT/JP2010/060448 mailed Jul. 20, 2010.

* cited by examiner

*Primary Examiner* — Dhaval Patel

(57) ABSTRACT

A channel estimation device comprises: a channel variation detection unit that determines whether variation width of a received signal level is not less than preset threshold width and whether variation period of received signal is not greater than preset threshold period; and a channel estimation unit that, if the channel variation detection unit determines that the variation width of the received signal level is not less than preset threshold width and that variation period is not greater than preset threshold period, refers to hysteresis of received signal level to determine whether lowering of received signal level is temporal, and, if it is determined that lowering of received signal level is temporal, allowing received signal to pass through, without removing received signal as noise, even when received signal level is not greater than signal level to be removed as noise.

17 Claims, 12 Drawing Sheets

RELATED ART

CHANNEL ESTIMATION APPARATUS, CHANNEL ESTIMATION METHOD AND PROGRAM

TECHNICAL FIELD

Reference to Related Application

This application is based upon and claims the benefit of the priority of Japanese patent application No. 2009-148860, filed on Jun. 23, 2009, the disclosure of which is incorporated herein in its entirety by reference thereto.

This invention relates to a channel estimation device, a channel estimation method and a program.

BACKGROUND

A method and a circuit for channel estimation of the related technique will be described with reference to the drawings. FIG. 11 depicts a block diagram showing an arrangement of a conventional channel estimation device.

Referring to FIG. 11, a wireless unit 902 converts an RF signal received over an antenna 901 into a baseband signal. A CP removing unit 903 removes a CP (Cyclic Prefix) region of the received signal. An initial stage FFT unit 904 performs discrete Fourier transform, using an OFDM (Orthogonal Frequency Division Multiplexing) symbol as a unit. An RS/data separation unit 905 separates an FFTed signal into RSs (Reference Signals) and data in accordance with a wireless frame format. A channel estimation unit 906 calculates transfer characteristics of a channel between sending and receiving devices based on the RSs. A demodulation unit 907 calculates soft decision bit values from the received data using a channel estimation value. An error correction/decoding unit 908 performs error correction/decoding on the soft decision bit values to restore a transmission bit sequence.

FIG. 12 depicts a block diagram showing an arrangement of the channel estimation unit 906 in a conventional channel estimation device. Referring to FIG. 12, an RS waveform shaping unit 919 converts RS symbols into a format suited to IFFT calculations. An RS signal generation unit 926 generates complex conjugates of an RS symbol sequence. A multiplication unit 920 performs complex multiplications to output the result of the calculations. An IFFT unit 921 performs inverse Fourier transform with N_IFFT points. A noise path removing unit 922 calculates the power of an input signal from one RS number to the next. If the power calculated is greater than a noise threshold value Nth, the noise path removing unit outputs the input signal per se and, if otherwise, the noise path removing unit outputs 0+j·0. An FFT unit 924 performs FFT calculations on the output signal of the noise path removing unit.

In Patent Document 1, there is shown a receiving device of the OFDM system, in which an estimated channel value of each sub-carrier high in accuracy may be obtained even in case the number of sub-carriers is not a power of 2. This is made possible by optimally carrying out noise removal of a delay profile obtained by IFFT processing of the estimated channel value of each sub-carrier.
[Patent Document 1]
JP Patent Kokai Publication No. JP-P2005-045628A

SUMMARY

The entire disclosure of the above Patent Document 1 is incorporated herein by reference thereto.

The following analysis is by the present inventor. The conventional channel estimation device is beset with the following problem:

Signal paths with the power not greater than the noise threshold value Nth is zeroed in the noise path removing unit 922. Hence, the channel estimation value is impaired to deteriorate the quality of a received signal. On the other hand, if the noise threshold value Nth is lowered to permit outputting signal paths of power not greater than the noise threshold value Nth to a demodulation unit, the noise also is allowed to pass, thus deteriorating the quality of a received signal.

Therefore, there is a need in the art to provide a channel estimation device, a channel estimation method, and a program that improve accuracy in channel estimation in case the reception level has dropped transiently.

According to a first aspect of the present invention, there is provided a channel estimation device comprising:
a channel variation detection unit that determines whether or not a variation width of a received signal level is not less than a preset threshold width and whether or not a variation period of the received signal is not greater than a preset threshold period; and
a channel estimation unit that, in case the channel variation detection unit determines that the variation width of the received signal level is not less than the preset threshold width and that the variation period is not greater than the preset threshold period, refers to a hysteresis of the received signal level to determine whether or not lowering of the received signal level is temporal, and, if it is determined that lowering of the received signal level is temporal, allowing the received signal to pass through, without removing the received signal as noise, even when the received signal level is not greater than a signal level to be removed as noise.

According to a second aspect of the present invention, there is provided a channel estimation method comprising:
determining whether or not a variation width of a received signal level is not less than a preset threshold width and whether or not a variation period is not greater than a preset threshold period; and
in case it is determined that the variation width of the received signal level is not less than the preset threshold width and that the variation period is not greater than the preset threshold period, referring to a hysteresis of the received signal level to determine whether or not lowering of the received signal level is temporal, and, if it is determined that lowering of the received signal level is temporal, allowing the received signal to pass through, without removing the received signal as noise, even when the received signal level is not greater than a signal level to be removed as noise.

According to a third aspect of the present invention, there is provided a program that causes a computer to execute:
determining whether or not a variation width of a received signal level is not less than a preset threshold width and whether or not a variation period is not greater than a preset threshold period; and
in case it is determined that the variation width of the received signal level is not less than the preset threshold width and that the variation period is not greater than the preset threshold period, referring to a hysteresis of the received signal level to determine whether or not lowering of the received signal level is temporal, and, if it is determined that lowering of the received signal level is temporal, allowing the received signal to pass through, without removing the received signal as noise, even when the received signal level is not greater than a signal level to be removed as noise.

The program may be recorded on a non-transitory computer-readable storage medium and provided as a program product.

With the apparatus and the method for channel estimation and the program, according to the present invention, it is possible to improve the accuracy in channel estimation in case the signal reception level has dropped temporarily.

PREFERRED MODES

Figure 1:
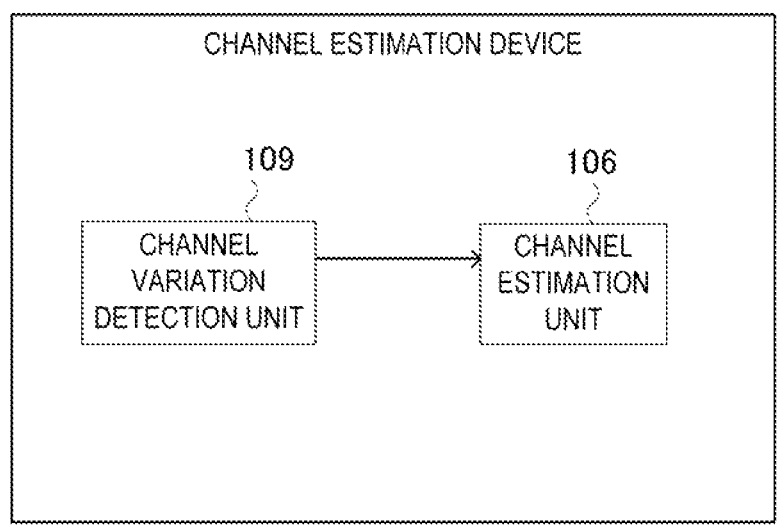
FIG. 1 is a block diagram showing a configuration of a channel estimation device according to a first exemplary embodiment.

In the present invention, there are various possible modes, which include the following, but not restricted thereto.
A channel estimation device in a first mode may be a channel estimation device according to the first aspect of the present invention.

In a channel estimation device in a second mode, the channel variation detection unit may determine that, in case standard deviation of the received signal level is not less than a preset threshold value, the variation width of the received signal level is not less than the preset threshold width.

In a channel estimation device in a third mode, in case number of times of crossings within a preset period of a moving average of the received signal level over a first period with a moving average of the received signal level over a second period longer than the first period is not less than a preset number of times, the channel variation detection unit may determine that the variation period of the received signal level is not greater than the preset threshold period.

In a channel estimation device in a fourth mode, the channel estimation unit may refer to a received signal level contained in a directly previous preset period as the hysteresis of the received signal level.

In a channel estimation device in a fifth mode, in case the received signal level contained in the directly previous preset period is greater at all times than a signal level to be removed as noise, the channel estimation unit may determine that lowering of the received signal level is temporal.

A wireless base station apparatus in a sixth mode may comprise any one of the above mentioned channel estimation devices.

A wireless communication system in a seventh mode may comprise the above mentioned wireless base station apparatus.

A channel estimation method in an eighth mode may be a channel estimation method according to the second aspect of the present invention.

In a channel estimation method in a ninth mode, the determining may comprise determining that, in case the standard deviation of the received signal level is not less than a preset threshold value, the variation width of the received signal level is not less than the preset threshold width.

In a channel estimation method in a tenth mode, in case number of times of crossings within a preset period of a moving average of the received signal level over a first period with a moving average of the received signal level over a second period longer than the first period is not less than a preset number of times, the determining may comprise determining that the variation period of the received signal level is not greater than the preset threshold period.

In a channel estimation method in an eleventh mode, the referring may comprise referring to a received signal level contained in a directly previous preset period as the hysteresis of the received signal level.

In a channel estimation method in a twelfth mode, in case the received signal level contained in the directly previous preset period is greater at all times than a signal level to be removed as noise, it may be determined that lowering of the received signal level is temporal.

A program in a thirteenth mode may be a program according to the third aspect of the present invention.

In a program in a fourteenth mode, the determining may comprise determining that, in case the standard deviation of the received signal level is not less than a preset threshold value, the variation width of the received signal level is not less than the preset threshold width.

In a program in a fifteenth mode, in case number of times of crossings within a preset period of a moving average of the received signal level over a first period with a moving average of the received signal level over a second period longer than the first period is not less than a preset number of times, the determining may comprise determining that the variation period of the received signal level is not greater than the preset threshold period.

In a program in a sixteenth mode, the referring may comprise referring to a received signal level contained in a directly previous preset period as the hysteresis of the received signal level.

In a program in a seventeenth mode, in case the received signal level contained in the directly previous preset period is greater at all times than a signal level to be removed as noise, it may be determined that lowering of the received signal level is temporal.

First Exemplary Embodiment

The channel estimation device of the present exemplary embodiment is provided on a receiver side of a communication system that uses OFDMA (Orthogonal Frequency Division Multiple Access) or SC-FDMA (Single-Carrier Frequency Division Multiple Access). It is supposed that, according to prediction by a channel estimation unit of the channel estimation device, a channel environment is such a one in which significant variations occur in the received powers of the signal paths, and that there exists a channel estimation value with the power not greater than a noise threshold value in one of the signal paths. With the present channel estimation device, the signal path where the channel estimation value is predicted to exist is allowed to pass through without being removed by the noise path removing unit based on the noise threshold value, thereby improving the accuracy on the channel estimation value. FIG. 1 depicts a block diagram showing a configuration of a channel estimation device of the present exemplary embodiment. Referring to FIG. 1, the channel estimation device includes a channel variation detection unit 109 and a channel estimation unit 106. The channel variation detection unit 109 checks whether or not the variation width of the received signal level is not less than a preset threshold width and whether or not the variation period is not greater than preset another threshold period. In case the channel variation detection unit 109 has concluded that the variation width of the received signal level is not less than the preset threshold width and also that the variation period is not greater than the preset threshold period, the channel estimation unit 106 refers to the hysteresis of the received signal level to decide whether or not the received signal level has dropped only transiently. If it is decided that the received signal level has dropped only transiently, the channel estimation unit 106 allowing the received signal to pass through, without removing it as noise, even though the received signal level is no greater than the level indicated to be removed as noise. The configuration and operation of the channel estimation device of the present exemplary embodiment will now be explained in detail with reference to the drawings.

Figure 2:
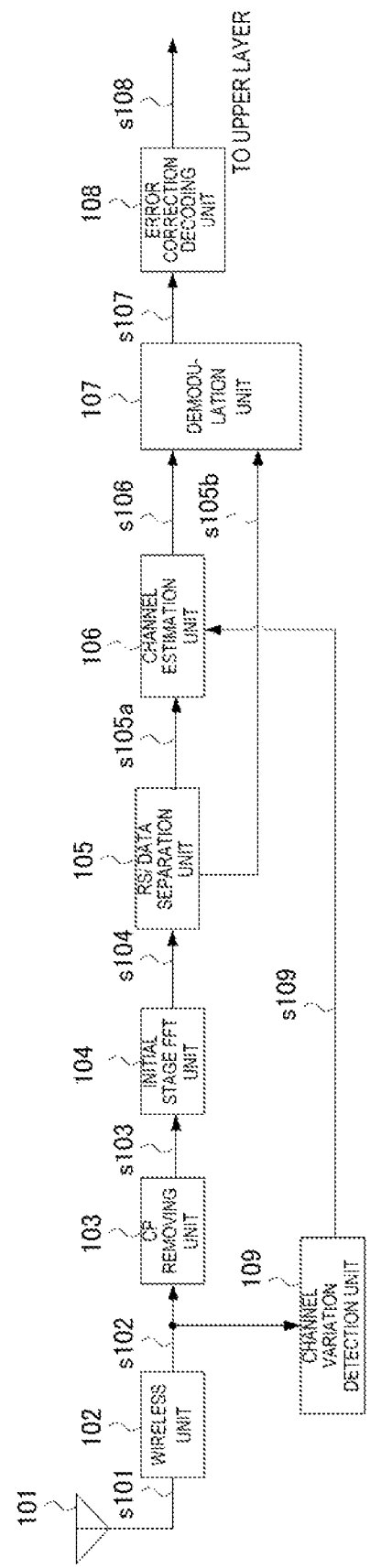
FIG. 2 is a more detailed block diagram showing a configuration of a channel estimation device according to the first exemplary embodiment.

The channel estimation device of a first exemplary embodiment will be described with reference to the drawings. FIG. 2 depicts a block diagram showing the configuration of a channel estimation device according to the present exemplary embodiment.

Referring to FIG. 2, a wireless unit 102 converts an RF signal, received at an antenna 101, into a baseband signal.

A CP removing unit 103 removes a CP (Cyclic Prefix) region of the received signal.

An initial stage FFT unit 104 performs discrete Fourier transform, using an OFDM symbol as a unit.

An RS/data separation unit 105 separates an FFTed signal into RSs (Reference Signals) and data in accordance with the wireless frame format.

A channel estimation unit 106 calculates transfer characteristics of a channel between the sending and receiving devices based on the RSs.

A demodulation unit 107 calculates soft decision bit values from received data, using a channel estimation value.

An error correction decoding unit 108 corrects the soft decision bit values for errors in order to decode it and restore a transmission bit sequence.

A channel variation detection unit 109 inputs an output signal s102 of the wireless unit 102 to detect whether or not there has arisen such a situation in which amplitude variations exceed a preset value and in which the period of variations has become not greater than another preset value. In case the preset values are exceeded, the channel variation detection unit 109 sets s109 to 1, while setting it to 0 otherwise. The channel variation detection unit outputs the signal s109 to the channel estimation unit 106.

Figure 3:
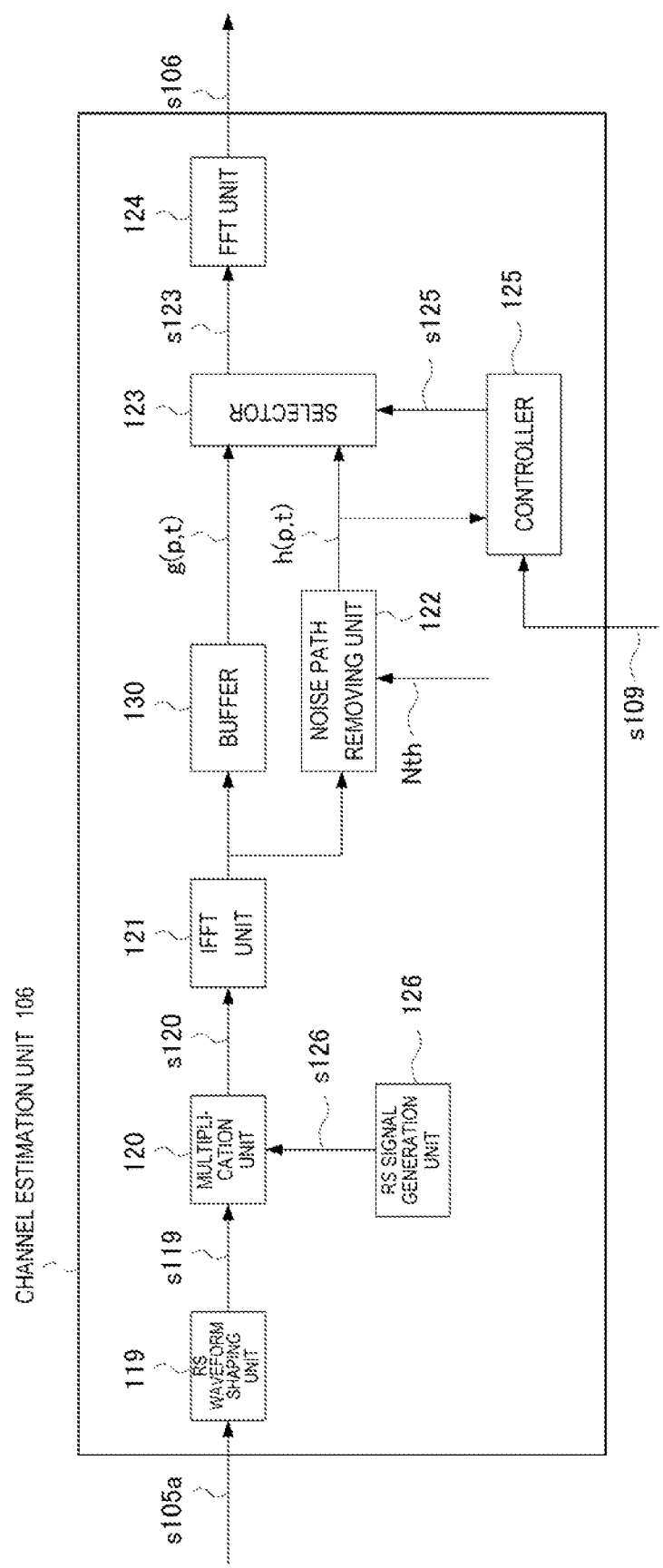
FIG. 3 is a block diagram showing a configuration of a channel estimation unit of the channel estimation device according to the first exemplary embodiment.

FIG. 3 depicts a block diagram showing an arrangement of the channel estimation unit 106 in the channel estimation device of the present exemplary embodiment.

Referring to FIG. 3, an RS waveform shaping unit 119 converts an RS symbol into a signal of a format suited to IFFT calculations.

Figure 6:
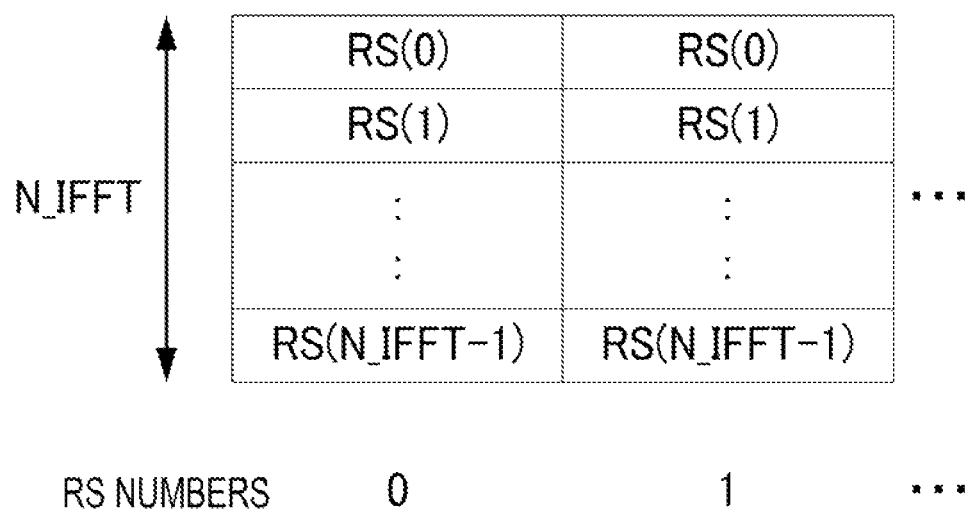
FIG. 6 shows an example format that allows IFFT calculations.

FIG. 6 shows an example of such format. Referring to FIG. 6, each set of RS numbers is composed of an N_IFFT-number of reference signals (RSs), where N_IFFT is a number equal to a power of 2.

An RS signal generation unit 126 generates complex conjugates of the RS symbol sequence. A multiplication unit 120 performs complex multiplications to output the result of the calculations.

An IFFT unit 121 inverse Fourier transforms a plurality of channel estimation values s120 equal to the number of the N_IFFT points by way of performing IFFT calculations.

A noise path removing unit 122 calculates power values of the input signals from one RS number to the next. If the power value calculated is greater than the noise threshold value Nth, the noise path removing unit outputs the input signal per se. Otherwise, the noise path removing unit outputs 0+j·0, where j denotes a unit of the imaginary number.

A buffer 130 delays the signal in response to delay in processing by the noise path removing unit 122. That is, the buffer 130 matches the timings of g(p, t) and h(p, t) to each other.

Figure 9:
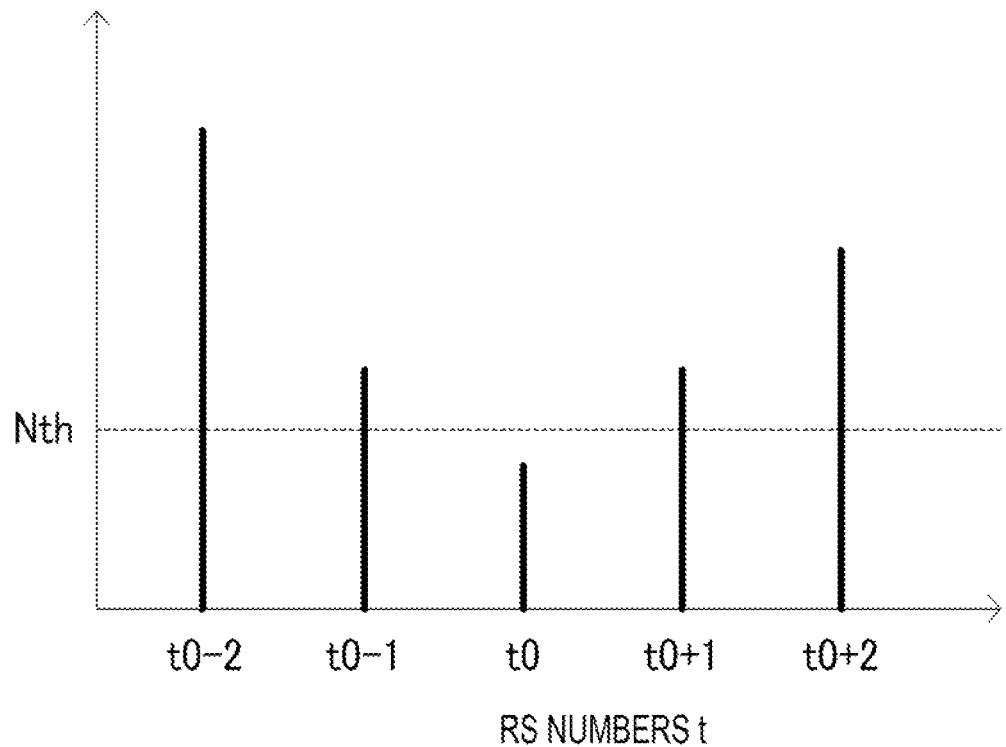
FIG. 9 is another graph showing a meritorious effect of the channel estimation device according to the first exemplary embodiment.

A controller 125 inputs the output signal h(p, t) of the noise path removing unit 122 to control a selector 123 based on the signal s109. It is noted that p denotes an IFFT point number such that p=0, 1, . . . , N_IFFT−1 and t denotes an RS number. When informed from the signal s109 that the width of the variations of the signal level is greater than its prescribed value and that the period of the variations is smaller than its prescribed value, the controller 125 decides the value of the control signal s125 for the selector 123 in accordance with the following sequence:

Referring to FIG. 9, if there existed two consecutive paths with the power not less than Nth for RS numbers t=t0−2 and t=t−1, for example, and that these paths erased at t=t0, it is probable that the path (p, t0) temporarily dropped to less than Nth due to amplitude variations. Hence, the controller 125 causes the selector 123 to select g(p, t).

The selector 123 selects the IFFT output g(p, t) or the output h(p, t) of the noise path removing unit, in accordance with the command from the controller 125, for the RS (Reference Signal) number at a time t, for each of the IFFT point numbers p (p=0, 1, . . . , N_IFFT−1). The so selected output is delivered to an FFT unit 124.

The FFT unit 124 FFTs an output signal s123 of the selector 123.

Figure 4:
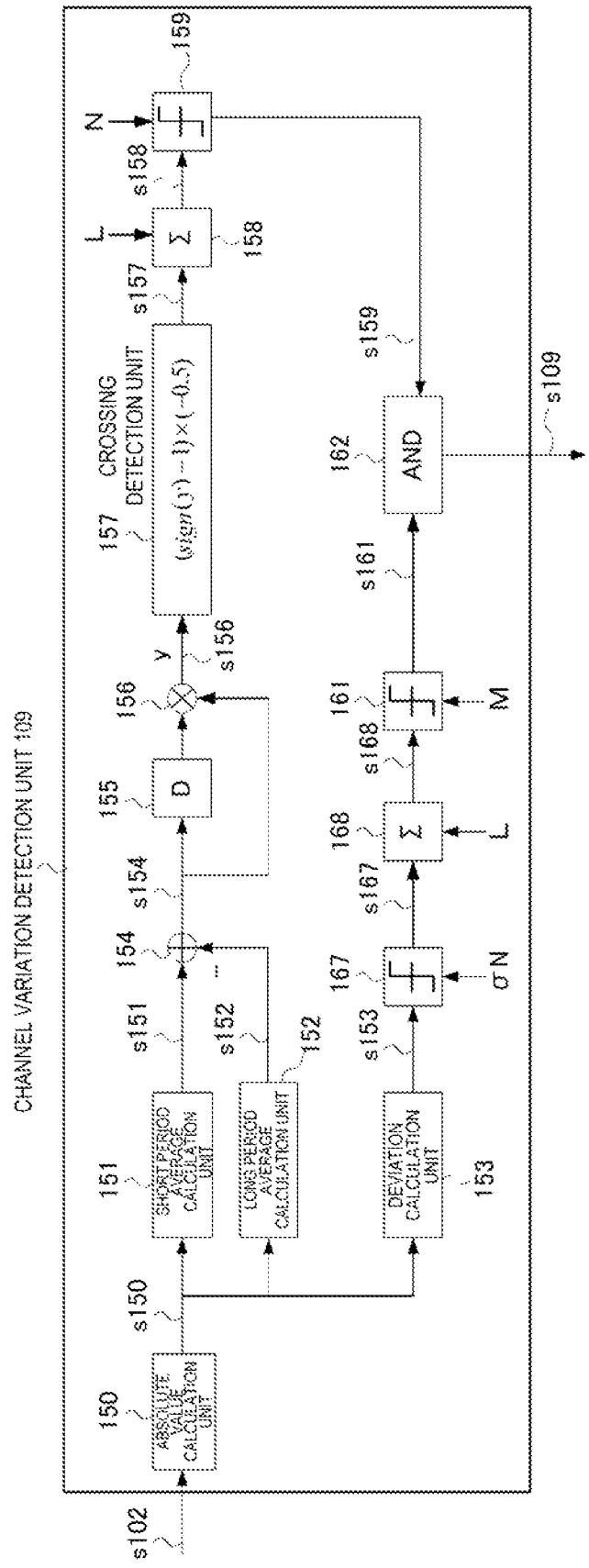
FIG. 4 is a block diagram showing a configuration of a channel variation estimation unit of the channel estimation device according to the first exemplary embodiment.

FIG. 4 depicts a block diagram showing an arrangement of the channel variation detection unit 109 in the channel estimation device according to the present exemplary embodiment. The channel variation detection unit 109 monitors the width and the period of level variations of the received signal. If the width of the level variations becomes not less than its prescribed value and the period of the level variations becomes not greater than its prescribed value, the channel variation detection unit notifies the channel estimation unit 106 of such purport by the signal s109.

Referring to FIG. 4, an absolute value calculation unit 150 calculates an absolute value of the complex number input signal s102, that is, calculates $a^2+b^2$, in case the input signal is $a+j·b$.

A short period average calculation unit 151 calculates a moving average of, for example, ten to scores of samples, and outputs the result as a short period moving average s151.

A long period average calculation unit 152 calculates a moving average of, for example, one hundred thousand to several hundred thousand samples, and outputs the result as a long period moving average s152.

A subtractor 154 calculates a difference between the short period moving average s151 and the long period moving average s152.

A delay element 155 has the function of delaying a signal by ten to scores of samples.

A multiplication unit performs multiplication.

A crossing detection unit 157 calculates (sign(y)−1)×(−0.5) of an input signal y. It is noted that sign(y) is 1 or −1, and hence an output signal of the crossing detection unit becomes equal to zero or one.

A crossing number of times counter 158 retains the number of '1's in the input signals in a past L-number of wireless frames, and outputs the number of '1's thus retained once every wireless frame.

A comparator 159 outputs one in case an input signal value is greater than a threshold value N, and outputs zero if otherwise.

A deviation calculation unit 153 calculates a standard deviation (s153) for one hundred thousand to several hundred thousand samples.

A comparator 167 outputs one in case the value of the standard deviation is greater than a threshold value σN, and outputs zero if otherwise.

A deviation counter 168 retains the number of '1's in the input signals in a past L-number of wireless frames, and outputs the number of '1's thus retained once every wireless frame.

A comparator 161 outputs one in case an input signal value is greater than M, while outputting zero if otherwise.

An AND gate 162 outputs a logical output of two input signals.

The component parts of FIG. 2 other than the channel estimation unit 106 and the channel variation detection unit 109 are well-known to those skilled in the art and hence the corresponding description thereof is dispensed with.

An operation of the channel estimation device of FIG. 2 will now be described in detail with reference to the drawings.

The CP removing unit 103 receives an incoming signal s102 that has been converted to a baseband signal by the wireless unit 102. The CP removing unit 103 removes the CP to deliver a CP-free signal to the initial stage FFT unit 104.

Figure 5:
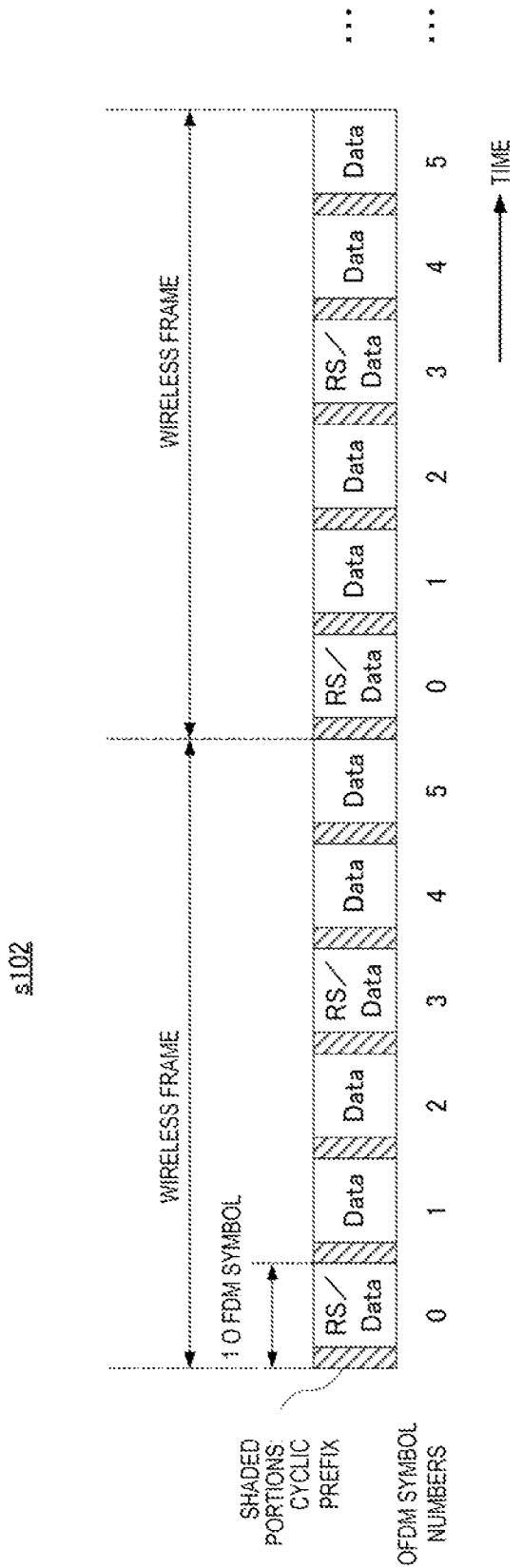
FIG. 5 shows a format of a received signal converted to a baseband signal.

FIG. 5 shows an example format of the incoming signal s102. Referring to FIG. 5, each wireless frame of the signal s102 is: made up of six OFDM symbols, each of which includes a CP (Cyclic Prefix).

It is noted that the signal s102 of the wireless unit 102 is delivered to the channel variation detection unit 109 as well.

The initial stage FFT unit 104 performs FFT, with the OFDM symbol of FIG. 5 as a unit, and delivers the result of the transform to the RS/data separation unit 105.

The RS/data separation unit 105 extracts just the RS in the format of FIG. 5, from the signal s104, and sends the so extracted RS to the channel estimation unit 106. The RS/data separation unit 105 also sends a data channel as a signal s105b to the demodulation unit 107.

Referring to FIG. 2, the channel estimation unit 106 calculates a channel estimation value, based on the RS s105a and on an output s109 of the channel variation detection unit, and delivers the so calculated value as signal s106 to the demodulation unit 107.

The demodulation unit 107 calculates a soft decision bit value signal s107 from the received data, using the channel estimation value, and delivers the signal s107 to the error correction decoding unit 108. The error correction decoding unit 108 corrects the soft decision bit value for errors by way of decoding. The error correction decoding unit restores the transmission bit sequence s108 which is sent to an upper layer.

Referring to FIG. 3, an operation of the channel estimation unit 106 will be explained.

Referring to FIG. 3, the RS waveform shaping unit 119 converts the input signal s105a, that is, the RS symbol, into a signal of a format suited to IFFT calculations, and sends the resulting signal as a signal s119 to the multiplication unit 120.

FIG. 6 shows an example format that allows IFFT calculations. Referring to FIG. 6, each RS number is made up of a set of an N_IFFT-number of reference signals (RSs). For example, the RSs of the OFDM symbol number 0 of FIG. 5 correspond to the RS number 0 of FIG. 6, and the RSs of the OFDM symbol number 3 of FIG. 5 correspond to the RS number 1 of FIG. 6, where N_IFFT is a power of 2.

The RS signal generation unit 126 generates complex conjugates of an RS symbol sequence, which complex conjugates are delivered as a signal s126 to the multiplication unit 120. The multiplication unit 120 performs complex multiplications on the signals s119 and s126 to deliver the result of the calculations to the IFFT unit 121.

The IFFT unit 121 performs inverse Fourier transform with N_IFFT points and delivers the result of the transform to the buffer 130 and to the noise path removing unit 122.

The noise path removing unit 122 calculates the power of the IFFT output signal. That is, if the power is greater than the noise threshold value Nth for each of the N_IFFT complex numbers, which are the result of one set of IFFT calculations, the power is directly output to the selector 123. If otherwise, 0+j·0 is output. An output signal of the noise path removing unit 122 is expressed as h(p, t), where p (=0, 1, . . . , N_IFFT−1) denotes an IFFT point number, and t denotes an RS number.

The buffer 130 affords the same delay value as that in the noise path removing unit 122 to deliver the resulting signal as a signal g(p, t) to the selector 123.

The selector 123 outputs one out of the inputs g(p, t) and h(p, t) to the FFT unit 124 in accordance with a command from the controller 125.

The FFT unit 124 FFTs the output signal s123 of the selector 123 to deliver the FFTed signal as a signal s106 to the demodulation unit 107 (FIG. 2).

Referring to FIG. 4, an operation of the channel variation detection unit 109 will be explained.

With reference to FIG. 4, on receiving the signal s102 from the wireless unit 102, the absolute value calculation unit 150 calculates a^2+b^2 for respective samples a+j·b (complex numbers). The result of calculations s150 is delivered to the short period average calculation unit 151, the long period average calculation unit 152 and to the deviation calculation unit 153.

The short period average calculation unit 151 calculates a moving average of, for example, ten to scores of samples.

The long period average calculation unit 152 calculates a moving average of, for example, one hundred thousand to several hundred thousand samples.

Figure 7:
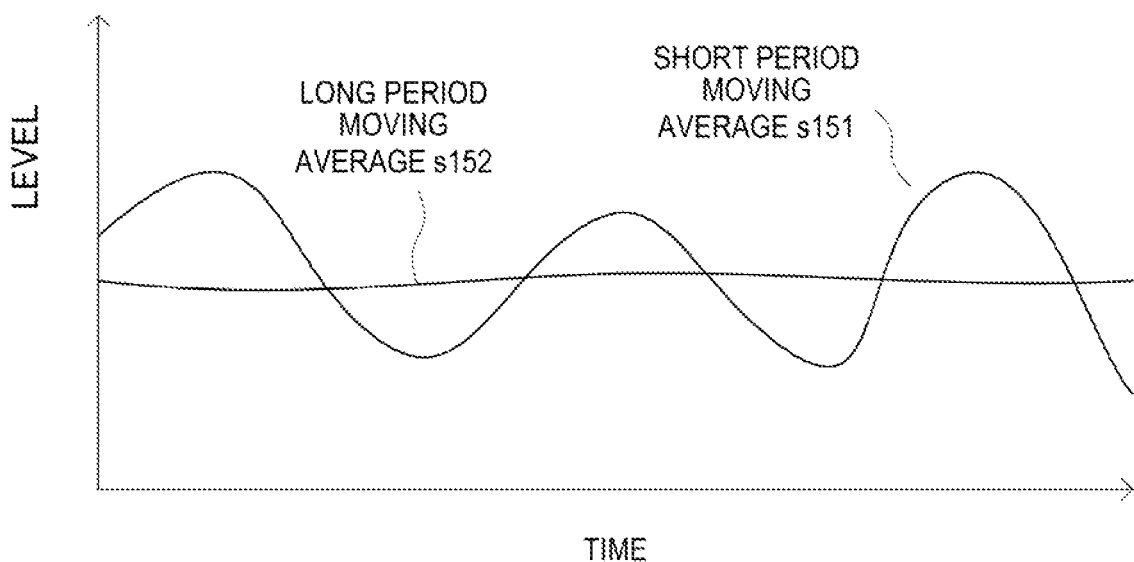
FIG. 7 shows an example long period moving average and an example short period moving average.

FIG. 7 shows, for example, an output signal from the short period average calculation unit 151 (short period moving average s151) and an output signal from the long period average calculation unit 152 (long period moving average s152). Referring to FIG. 7, the shorter the period of variations, the larger becomes the number of times of crossings of the short period moving average s151 with the long period moving average s152.

The subtractor 154 and the delay element 155 detect the inversion of the large/small relationship of the signals s151 and s152. Should the inversion occur, an output signal y of the multiplication unit 156 becomes of a negative value.

The crossing detection unit 157 detects the occurrence of the negative value in the signal y. The crossing detection unit 157 calculates (sign(y)−1)×(−0.5) and outputs 1 to the crossing number of times counter 158 if y is of a negative value, while outputting 0 if otherwise. Note that sign(y) is a function that detects the sign of y, and that sign(*)=1 for y being not a negative value and =−1 otherwise.

The crossing number of times counter 158 retains the number of '1's in the input signals in past L wireless frames, L being a preset value, and delivers the value held as a signal s158, once every wireless frame, to the comparator 159.

In case the value of the signal s158 is not less than a threshold value N, the comparator 159 sets the signal s159 to 1 and outputs it to the AND gate 162. If otherwise, the comparator sets the signal s159 to 0 to output it to the AND gate.

By the above operation, if level crossings between the two signals of FIG. 7 should occur not less than N times in the past L wireless frames, the signal s159 becomes one. If otherwise, the signal s159 becomes zero.

If supplied with the signal s150, the deviation calculation unit 153 calculates a standard deviation for one hundred thousand to several hundred thousand sample signals, and delivers the calculated results as signal s153 to the comparator 167.

In case the input signal to the comparator 167 is of a value not less than the threshold value σN, the comparator outputs one to the deviation counter 168. If otherwise, the comparator outputs zero to the deviation counter.

The deviation counter 168 retains the number of '1's in the input signals in the past L wireless frames, and delivers the so retained value to the comparator 161 once every wireless frame.

In case the input signal value is not less than a threshold value M, the comparator 161 outputs one. If otherwise, the comparator outputs zero.

By the above operation, if the case of the standard deviation of the absolute values of the signal s102 being greater than the preset threshold value σN occurred not less than M times in the past L wireless frames, the signal s161 is one. If otherwise, the signal s161 is zero.

The AND gate 162 outputs a logical product of the two input signals s159 and s161 as a signal s109.

It is noted that the signal s109 is of a value of one only in case of large amplitude variations and short period variations of the received signals in the past L wireless frames.

Figure 10:
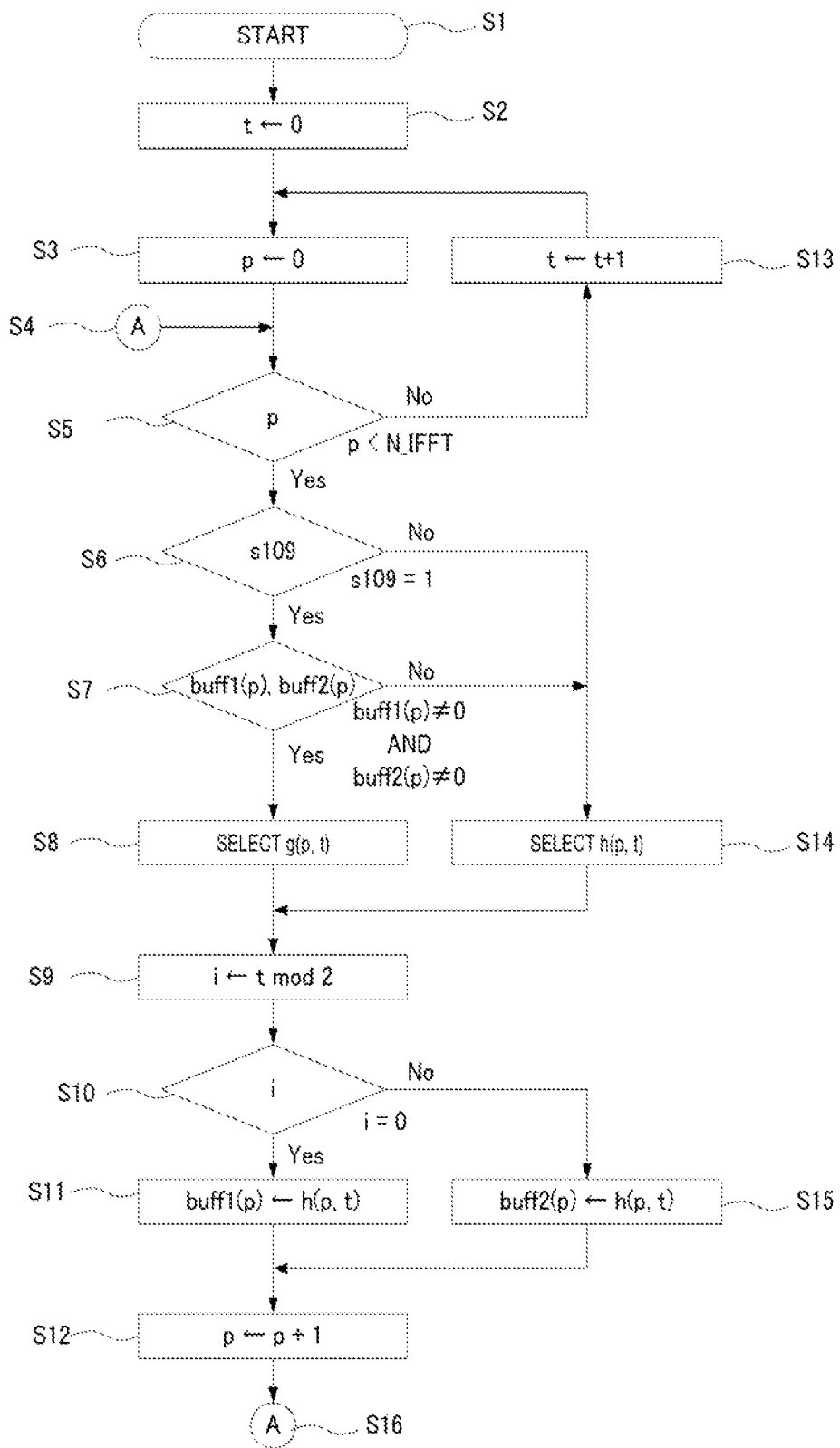
FIG. 10 is a flowchart showing an operation of a controller in a channel estimation device according to the first exemplary embodiment.
Figure 11:
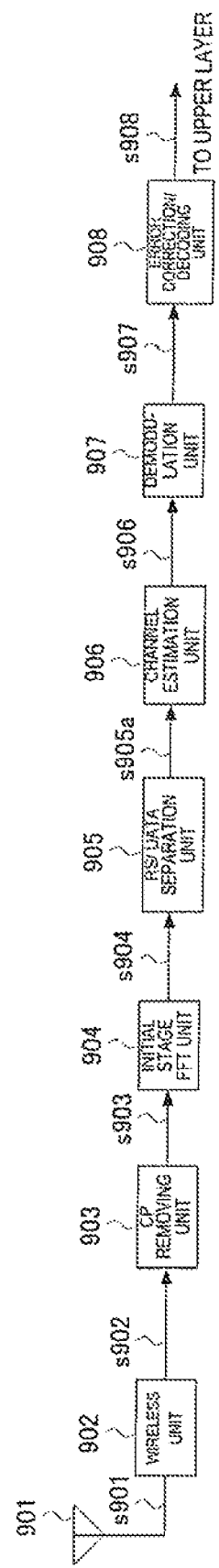
FIG. 11 is a block diagram showing a configuration of a conventional channel estimation device.
Figure 12:
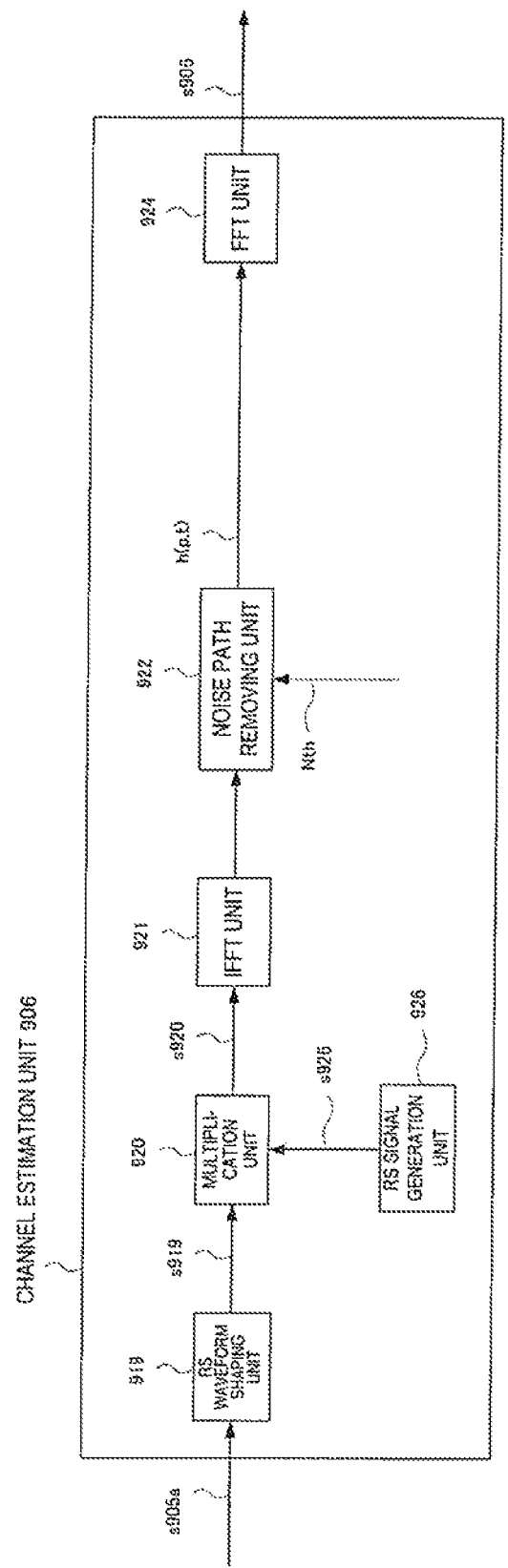
FIG. 12 is a block diagram showing a configuration of a channel estimation unit of the conventional channel estimation device.

FIG. 10 depicts a flowchart showing an operation of the controller 125 in the channel estimation device according to the present exemplary embodiment.

Referring to FIG. 10, on startup of the controller operation, the controller 125 substitutes an initial value zero into each of t and p (step S2, S3).

If p is less than N_IFFT (Yes of step S5), the controller 125 checks the value of the signal s109 (step S6).

If the value of the signal s109 is one (Yes of step S6), the controller evaluates the values of buff1($p$) and buff2($p$) (step S7). If none of these values is 0+j·0 (Yes of step S7), the controller causes the selector 123 to select g(p, t), that is, an output per se of the IFFT unit 121 (step S8).

That is, if the following two conditions are met, the controller 125 causes the selector 123 to select an output g(p, t) of the buffer 130 in place of selecting an output h(p, t) of the noise path removing unit 122 (step S8) even in case the current IFFT output h(p, t) is not larger than the threshold value Nth. These two conditions are (1) that s109=1, viz., the amplitude variations and the period of variations of the received signal are large and small, respectively, and (2) that the past two noise level threshold values buff1 ($p, t$) and buff2 ($p, t$) are not less than Nth. It may be seen that the two conditions correspond to Yes of the step S6 and Yes of the step S7.

If at least one of the above conditions (1), (2) is not met (No of the step S6 or No of the step S7), the controller 125 causes the selector 123 to select h(p, t) (step S14).

Then, t mod 2 (remainder upon division of t by 2) is substituted into a variable i (step S9) and the latest h(p, t) is substituted into the buff1($p$) and the buff2($p$) alternately (step S11, S15). Note that the buff1 and the buff2 retain past two h(p, t)s at all times.

The IFFT point number is then incremented by one (step S12) so that the program is in an initial state of processing for the next IFFT point number p (step S5).

If the IFFT number p has become equal to or greater than N_IFFT (No of the step S5), the RS number t is incremented (step S13).

With the channel estimation device of the present exemplary embodiment, the following meritorious effect may be derived.

With the channel estimation device of the present exemplary embodiment, it is checked by the noise path removing unit 122 of the channel estimation unit 106 whether or not there exists a signal path greater than the noise threshold value in the past output value hysteresis of the noise path removing unit. This check is done only in case the channel variation detection unit 109 has detected such a channel state in which amplitude variations are significant and the period of amplitude variations is of shorter duration. In such case, the noise threshold value is not applied to a signal path for which there exists in the past output value hysteresis such signal path greater than the noise threshold value. That is, removal of such signal path by the noise path removing unit 122 is forestalled.

Thus, with the channel estimation device of the present exemplary embodiment, the signal path, whose level has dropped only for short time duration, may selectively be routed to the demodulation unit 107, thereby improving the quality of the received signal.

Figure 8:
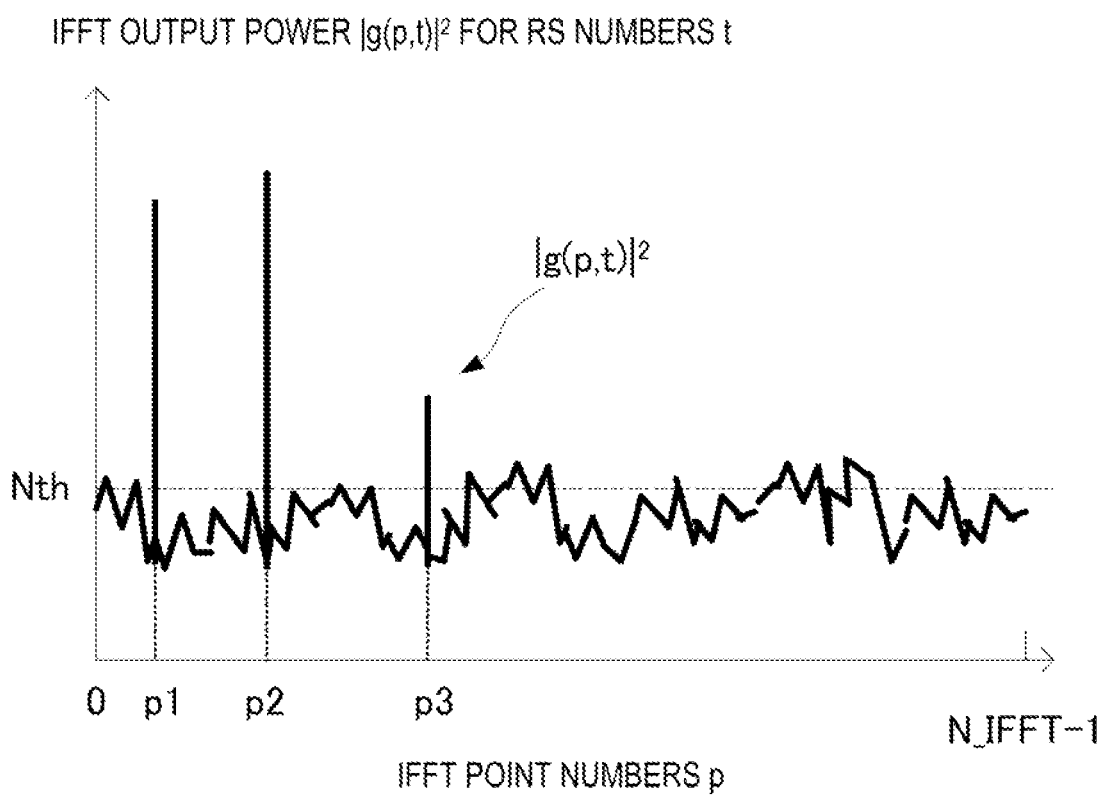
FIG. 8 is a graph showing a meritorious effect of the channel estimation device according to the first exemplary embodiment.

Referring to FIGS. 8 and 9, the meritorious effect of the channel estimation device of the present exemplary embodiment will now be explained. FIG. 8 shows IFFT outputs for a given RS number t. Three signal paths are erected at IFFT point numbers p1 to p3, with the noise level approaching the noise threshold value Nth.

FIG. 9 shows example transition with time of the signal path with the IFFT point number p1 among the signal paths shown in FIG. 8. It is seen that, in FIG. 9, the square of the absolute value of the power of the signal path $|g(p, t)|^2$ at the RS number t=t0 is less than the threshold value Nth. Hence, the signal path may be removed by the noise path removing unit 122 such that an output is 0+j·0. If the threshold value Nth is lowered to allow passage of the signal path, the noise may be passed through the noise path removing unit 122, thus degrading the channel estimation value. In the channel estimation device of the present exemplary embodiment, it is possible to forestall applying the noise threshold value just to a specified IFFT point number p by referring to the hysteresis of past path levels.

The above description has been made of a preferred exemplary embodiment. However, the present invention is not limited to the preferred exemplary embodiment.

In the framework of entire disclosure of the present invention (including the claims), and based on its basic technological idea, exemplary embodiments or examples of the present invention may be changed and/or adjusted. Also it should be noted that in the framework of the claims of the present invention, any combinations or selections of various elements (including each element of each claim, each element of each exemplary embodiment, each element of each drawing, etc.) disclosed here in are possible. That is, needless to say, it is understood by those skilled in the art that various changes or modifications can be made to the present invention based on the disclosure of the present invention including the claims and the technological idea of the present invention.

The invention claimed is:

1. A channel estimation device comprising:
    a channel variation detection unit that determines whether or not a variation width of a received signal level is not less than a preset threshold width and whether or not a variation period of the received signal is not greater than a preset threshold period; and
    a channel estimation unit that, in case the channel variation detection unit determines that the variation width of the received signal level is not less than the preset threshold width and that the variation period is not greater than the preset threshold period, refers to a hysteresis of the received signal level to determine whether or not lowering of the received signal level is temporal, and, if it is determined that lowering of the received signal level is temporal, allows the received signal to pass through, without removing the received signal as noise, even when the received signal level is not greater than a signal level to be removed as noise.

2. The channel estimation device according to claim 1, wherein
    the channel variation detection unit determines that, in case standard deviation of the received signal level is not less than a preset threshold value, the variation width of the received signal level is not less than the preset threshold width.

3. The channel estimation device according to claim 1, wherein,
    in case number of times of crossings within a preset period of a moving average of the received signal level over a first period with a moving average of the received signal level over a second period longer than the first period is not less than a preset number of times, the channel variation detection unit determines that the variation period of the received signal level is not greater than the preset threshold period.

4. The channel estimation device according to claim 1, wherein,
    the channel estimation unit refers to a received signal level contained in a directly previous preset period as the hysteresis of the received signal level.

5. The channel estimation device according to claim 4, wherein,
    in case the received signal level contained in the directly previous preset period is greater at all times than a signal level to be removed as noise, the channel estimation unit determines that lowering of the received signal level is temporal.

6. A wireless base station apparatus comprising the channel estimation device according to claim 1.

7. A wireless communication system comprising the wireless base station apparatus according to claim 6.

8. A channel estimation method comprising:
    determining whether or not a variation width of a received signal level is not less than a preset threshold width and whether or not a variation period is not greater than a preset threshold period; and
    in case it is determined that the variation width of the received signal level is not less than the preset threshold width and that the variation period is not greater than the preset threshold period, referring to a hysteresis of the received signal level to determine whether or not lowering of the received signal level is temporal, and, if it is determined that lowering of the received signal level is temporal, allowing the received signal to pass through, without removing the received signal as noise, even when the received signal level is not greater than a signal level to be removed as noise.

9. The channel estimation method according to claim 8, wherein
    the determining comprises determining that, in case the standard deviation of the received signal level is not less than a preset threshold value, the variation width of the received signal level is not less than the preset threshold width.

10. The channel estimation method according to claim 8, wherein,
    in case number of times of crossings within a preset period of a moving average of the received signal level over a first period with a moving average of the received signal level over a second period longer than the first period is not less than a preset number of times, the determining comprises determining that the variation period of the received signal level is not greater than the preset threshold period.

11. The channel estimation method according to claim 8, wherein
    the referring comprises referring to a received signal level contained in a directly previous preset period as the hysteresis of the received signal level.

12. The channel estimation method according to claim 11, wherein,
    in case the received signal level contained in the directly previous preset period is greater at all times than a signal level to be removed as noise, it is determined that lowering of the received signal level is temporal.

13. A non-transitory recording medium storing a program that causes a computer to execute:
    determining whether or not a variation width of a received signal level is not less than a preset threshold width and whether or not a variation period is not greater than a preset threshold period; and
    in case it is determined that the variation width of the received signal level is not less than the preset threshold width and that the variation period is not greater than the preset threshold period, referring to a hysteresis of the received signal level to determine whether or not lowering of the received signal level is temporal, and, if it is determined that lowering of the received signal level is temporal, allowing the received signal to pass through, without removing the received signal as noise, even when the received signal level is not greater than a signal level to be removed as noise.

14. The non-transitory recording medium according to claim 13, wherein,
    the determining comprises determining that, in case the standard deviation of the received signal level is not less than a preset threshold value, the variation width of the received signal level is not less than the preset threshold width.

15. The non-transitory recording medium according to claim 13, wherein,
    in case number of times of crossings within a preset period of a moving average of the received signal level over a first period with a moving average of the received signal level over a second period longer than the first period is not less than a preset number of times, the determining comprises determining that the variation period of the received signal level is not greater than the preset threshold period.

16. The non-transitory recording medium according to claim 13, wherein,
the referring comprises referring to a received signal level contained in a directly previous preset period as the hysteresis of the received signal level.

17. The non-transitory recording medium according to claim 16, wherein,
in case the received signal level contained in the directly previous preset period is greater at all times than a signal level to be removed as noise, it is determined that lowering of the received signal level is temporal.

* * * * *